Oct. 6, 1959  L. REXON  2,907,890
LIGHT PULSE RESPONSIVE REGISTRATION DEVICES
Filed Sept. 17, 1954
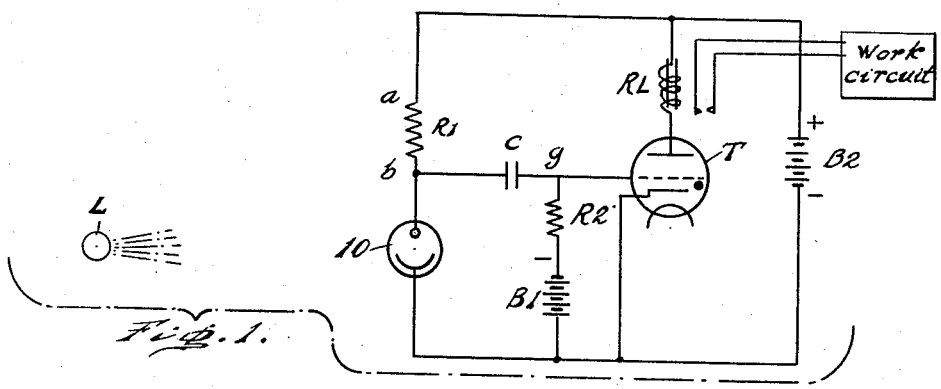
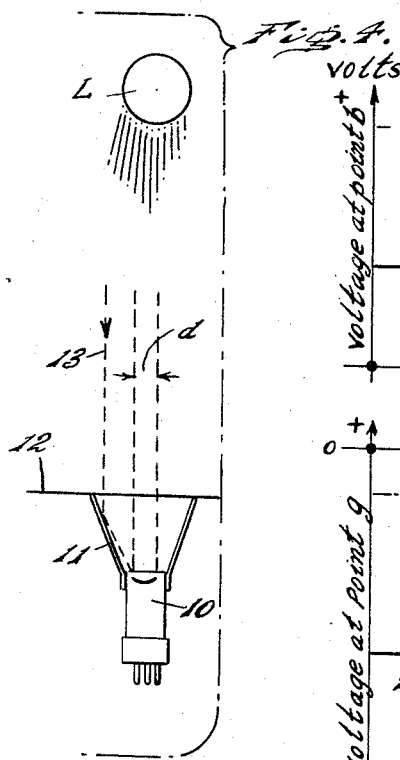
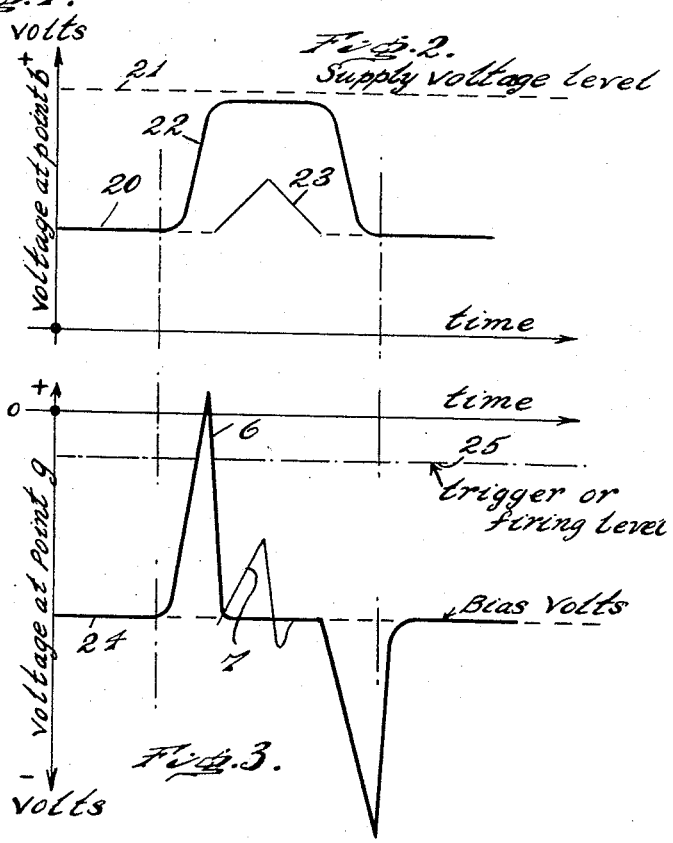
INVENTOR.
Lester Rexon.
BY Frank H Borden
ATTORNEY : 2,907,890
Patented Oct. 6, 1959

2,907,890

LIGHT PULSE RESPONSIVE REGISTRATION DEVICES

Lester Rexon, Moorestown, N.J., assignor to Victor Development Co., Camden, N.J., a corporation of New Jersey Application September 17, 1954, Serial No. 456,853

4 Claims. (Cl. 250—222)

This invention relates to light pulse responsive registration devices, and particularly to circuits for triggering electronic relay switching means in response either to positive or negative changes in light incident on a phototube.

While the invention is of broad application, it is particularly applicable to use as a component of the electronic golf drive interpreter, or the like, such as disclosed in application Serial No. 380,232, filed on September 15, 1953, by Rexon, now abandoned.

According to said application, a ball simulation in effectively teed relation to a platform or the like is subjected to an impact by a driver golf club swung on an arcuate path by the user of the interpreter standing on the platform. Light responsive means are provided indicating by signals the general path of the clubhead, and these are correlated with an electrical impact value signal to plot a resultant flight path of the theoretical ball on an indicator board. While the particular pattern organization of the light responsive means and their circuits, as regards distribution on the platform forms no particular part of the present invention, as they may be as shown in said application, there is an underlying problem in the organization of the light responsive registration devices for use in an electronic golf drive interpreter.

This problem is to so organize the light pulse responsive registration devices that on the one hand they are effectively actuated only when the clubhead intercepts the light beam, and only then when the clubhead has attained a velocity equal to or higher than a predetermined value.

On the other hand, the registration devices are to remain in their normally de-energized operating condition when the light beam is intercepted by any other part of the club such as the shaft, regardless of the velocity with which the shaft is being propelled. These two specific limiting conditions are imposed upon a properly operating golf drive interpreter in order to prevent the registration devices from becoming operative by light changes caused by addressing the ball and taking some preliminary waggles or by moving bodily about on the platform or by any part of the club other than the head.

It is among the objects of this invention to improve light pulse responsive registration devices; to provide a triggering circuit for a phototube organization responsive to phototube current changes only when a predeterminedly large object intercepts the light beam at a velocity equal to or higher than a predetermined minimum; to utilize a small and relatively inexpensive phototube and operate same in such a way that its response to light changes differentiates between the area of the light intercepting object, remaining practically insensitive to objects whose area is equal to or smaller than that of the cathode of said tube; and to provide other objects and advantages as will become more apparent as the description proceeds.

In the accompanying drawings forming part of this description:

Figure 1 represents a diagram of a light pulse responsive switching circuit and registration device.

Figure 2 illustrates the change of potential across the phototube as a function of both light intensity variation and time.

Figure 3 correlating with Fig. 2, shows the voltage pulses produced at the grid of the trigger tube, after they have passed the differentiating elements.

Figure 4 is a simplified diagram of the phototube and light gathering arrangement.

Referring to Fig. 1, a photocell 10 is energized by a voltage supply source B2 through resistor R1. A gas-filled grid controlled tube T in series with a relay RL is connected across the same power supply B2. A negative bias is provided at the grid of tube T by battery B1 and through resistor R2. The grid of tube T is connected through capacitor C to the junction $b$ of resistor R1 and the anode of the photocell 10.

By way of example, assume that point $a$ in Fig. 1 has 70 volts provided by power supply B2. Since no voltage drop occurs across resistor R1 as long as no light enters the photocell, point $b$, i.e., the anode of the cell has also 70 volts against ground potential. However, if light were provided by lamp L and thrown on to the cell, the latter would draw current and thus cause the voltage at point $b$ to drop to say 20 volts. It is obvious then that a voltage difference of 50 volts would appear across R1. The same is true for the reverse pattern, i.e., when a change from full light (20 volts) to absence of light is made (70 volts), the change is also 50 volts.

Between these on-and-off states point $b$ can assume any voltage from 20 to 70 volts depending on the amount of light incident on the photocell 10. Since grid $g$ of tube T is coupled to the anode of photocell 10 by means of capacitor C, any change in the voltage developed across the photocell can produce a corresponding voltage change at the grid of tube T. If this voltage change is positive and its magnitude is large enough to effectively reduce the bias potential at grid $g$, tube T can fire and operate relay RL. The relay contacts will close and remain closed even if and when the voltage that caused the firing of tube T has disappeared.

The relay contacts are connected to a work circuit as illustrated by block unit in Figure 1. The work circuit itself may consist of signal lamps, bells, or any other form of an indicating device. Since this work circuit, per se, is no part of the present invention its detailed description is believed to be unnecessary. However, it may be pointed out that it is the final object of the organization of the light responsive switching device to produce a retained indication, or signal, whenever the light beam incident on photocell 10 is properly interrupted by a passing object. The indication can be erased, i.e. both the work circuit and relay RL can be released and thereby the entire circuit restored to its initial operating condition by means well known in the art, for example, by instantaneously interrupting the plate supply of tube T.

In order to comply with the aforementioned limiting conditions, the circuit must be made responsive to the rate of change of light as well as to the rate of change of the magnitude of light. In other words, the switching device properly and substantially consisting of tube T and relay RL should remain de-energized if the light beam is interrupted by a large object at slow speed, and it should also remain inoperative when the light change is produced by a small object even at extremely high velocity.

The differentiation between the two predetermined established conditions can be achieved by properly adjusting the time constant of the electrical elements R1, C, and R2 to produce voltage pulses of proper wave form and magnitude at point $g$. The operation of this differentiating and pulse shaping circuit can better be understood in combination with Figures 2 and 3. Figure 2 illustrates the potential change across photocell 10 as a function of both light change and time. The power supply voltage level is illustrated by dotted line 21. Continuous light incident upon the photocell reduces the voltage across same to the level indicated by solid line 20. In Figure 2 it is assumed that the light is intercepted first by an object whose area is equal to or greater than the area of the cathode of the phototube, to produce curve 22, and secondly by an object of smaller size than that of said cathode, to produce curve 23. It is further assumed that both objects intercept the light beam at about the same velocity. It can be seen from Figure 2, and it will be easily understood by those skilled in the art, that the voltage time curve produced by the large object approaches theoretically a square wave indicated at 22, while that produced by the small object approaches in the best case a triangular wave form indicated at 23.

The voltage change thus produced at point b (Fig. 1) will cause a voltage pulse at point g according to charge and discharge time constants of the elements R1, C, and R2. This is illustrated in Figure 3, in which the vertical axis represents the instantaneous value of the grid-to-cathode voltage of tube T. The horizontal axis, as in Fig. 2, represents time. The applied grid bias has the level indicated by line 24, while the potential at which tube T will fire is represented by line 25. Figure 3 illustrates in addition that a positive voltage pulse 6 is produced at the grid in response to voltage change 22 of Fig. 2. Since this voltage pulse is opposite to the negative grid bias and reduces the effective potential at grid g to a level at which tube T will fire, relay R1 drops in and energizes the work circuit. On the other hand, a pulse 7 produced by voltage change 23 of Fig. 2 is not sufficient to decrease effectively the grid bias of tube T, therefore, this tube remains unaffected by the aforementioned voltage pulse which was caused by a smaller object. Thus, it is obvious that by properly adjusting the time constant determining elements in the light pulse responsive registration device, the latter can be made immune to instantaneous light interruptions caused by an object of predetermined small size regardless of the velocity at which said interruption occurs. In addition, the device can be made to remain de-energized for light interruption caused by large objects if the rate of darkening or shadowing is lower than a predetermined value.

The circuit organization of Figure 1 is perfectly adapted to the just mentioned conjoint functions, but it will be apparent to those skilled in the art that various modifications may be made therein to accomplish related purposes, and, as noted, Figure 1 is considered illustrative and not limitative.

In the above discussion it has been assumed for illustrative purposes that the beam and the cathode of the photocell 10 have been respectively of such width and area that interception of the beam and blanketing by the clubhead of the cathode of such tube has been susceptible of accomplishment. However, it will be evident that a photocell with a cathode of such area is an expensive item, and, owing to its necessary size imposes problems in distribution of plural tubes on the playing platform.

It will follow from the preceding description that the effective size or area of the cathode of photocell 10 must be related either directly or in some other manner to the area of the clubhead, in order to avoid blanketing of the cathode by a smaller shadow.

In furtherance of the utilization of a photocell with a physically small area of cathode, light gathering means may be employed in order to improve the optical-electrical transducer efficiency. According to this invention best results have been obtained with a combination arrangement as shown in Figure 4.

A light-reflecting cone 11 may have its wide open mouth flush with the surface of the playing platform 12 of the golf driver interpreter. The small end of the cone 11 is juxtaposed to the cathode of the tube 10. The cone itself may be made of material such as glass, metal, or plastic, provided, however, that its inner surface possesses the highest possible reflection coefficient, but is otherwise opaque. By choosing a suitable value of the slope or the angle for the wall of the cone 11 it can be assumed that the photocell receives from the light source L not only a direct beam d equal to the area of the cathode of the cell, but also, in addition, rays such as 13, that impinge upon the inner surface of the cone 11 from which they are reflected inwardly.

It may be noted in passing that of the presently available commercial phototubes, tubes of the type of RCA 918 have a cathode area of .78 square inch, which is not more than ⅛ of the area of the average driver clubhead shadow, which is of the order of 8 square inches. The conical reflector and transmitter 11 provide by their presence and use a workable arrangement with a photocell or tube of the class just mentioned. The reflecting cone not only permits differentiation between the shaft and head of the club in reaction of the tube to the shadow cast thereon, with proper sizes and angles it permits the use of a much smaller size of photocell. This smaller size permits greater facility in the selection of appropriate cells, with reduction in their basic costs, and it also contributes markedly to the freedom of distribution in the selected pattern on the playing platform. The platform and the pattern of photocells may be considered as the selected follow-through area.

It will be apparent that various lens organizations may be used with the photocells to increase the effective operative area of the cathodes thereof. For instance, planoconvex or other lens systems may be so mounted as to reproject or to condense a wide beam focused on the small cathode of a phototube, and be useful in the connection, even if the cathode of the phototube is as small as of the order of .025 square inch, as typified, for instance, by RCA tube 1P41, for example. On the other hand, such lens organizations require an area capable of receiving a beam of a diameter of illustratively 3.2 inches in diameter, to take account of the interception thereof by the average clubhead, it requires additional and expensive means for mounting and adjustably focusing same. For practical purposes, therefore, condensing lens systems are undesirable and deficient.

With the reflecting cone 11 disclosed, however, with the inner surface of the cone well polished and highly reflective, the same beneficial results of the lens organizations is attained, without the cost and focusing difficulties thereof. It will be recognized that without the funnel or cone 11, the cell 10 would receive only the direct light beam d from the source L thereto, since any rays in the beam not incident on the cathode of the tube would get lost, and be ineffective on the cell. By using the funnel shown, however, other light rays in the beam can reach the cell in addition to those directly incident thereon. The advantages of this device will be apparent.

It will be evident as a fundamental of the circuitry that although it requires both blanketing area and velocity to trigger the circuit, the organization is such that the signal from the shaft shadowing is always smaller than that of the clubhead shadowing and this is regardless of the relative speeds of translation of the shadow. In other words, the signal from the shaft shadowing, regardless of its velocity, is always smaller in amplitude than that created by the clubhead shadowing, regardless of its velocity.

Having thus described my invention, I claim:

1. In an apparatus for photo-electrically detecting moving objects selectively both as to their size and their rate of motion, a photo-electric trigger circuit comprising a source of radiant energy, a photoelectric cell upon which radiant energy from said source is incident, an output circuit connected to said photocell and including at least a resistor for deriving a voltage transient therefrom in response to an interception of the radiant energy incident upon said photocell, an electronic trigger device of the bi-stable type brought into its conductive state by a predetermined voltage applied to its input electrode, and wave form shaping means comprising at least a capacitor and a second resistor connected in series, said wave form shaping means connected between said output circuit and said trigger device to provide differentiation of the wave form of said transient voltage delivered by said output circuit for establishing positive triggering action solely to a voltage transient of predetermined wave form magnitude and polarity, consequent upon an interruption of the incidence of radiant energy on said photocell by an object of given size and given rate of motion.

2. In an apparatus for photo-electrically detecting moving objects selectively as to both their size and their rate of propulsion, a photo-electric trigger circuit comprising a light source, a photocell associated with and energized by said light source, an output circuit connected to said photocell and including at least a first resistor for deriving a voltage transient therefrom in response to interception of the light incident upon said photocell, an electronic trigger device of the bi-stable type brought into its conductive state by a predetermined voltage applied to its input electrode, a wave form shaping means comprising at least a capacitor and a second resistor inserted between said output circuit and said trigger device for differentiating the wave form of the voltage transient delivered from said output circuit, and a substantially frusto-conical reflective light gathering hood the larger opening of which is directed toward said light source and is substantially of the area of said object of given size and the smaller opening of which fits closely to and surrounds said photocell.

3. Apparatus as in claim 1, in an electronic golf drive interpreter, in which said given size comprises that of the head of a golf club and wherein the object smaller than said given size may comprise the shaft of such golf club.

4. Apparatus as in claim 2, in an electronic golf drive interpreter, in which said given size comprises that of the head of a golf club and wherein the object smaller than said given size may comprise the shaft of such golf club.

References Cited in the file of this patent

UNITED STATES PATENTS

| | | |
|---|---|---|
| 1,966,243 | Hanna et al. | July 10, 1934 |
| 1,985,563 | Fitz Gerald | Dec. 25, 1934 |
| 1,998,132 | Geffcken et al. | Apr. 16, 1935 |
| 2,203,761 | Williams | June 11, 1940 |
| 2,411,078 | Aubert | Nov. 12, 1946 |
| 2,411,531 | Engelhardt | Nov. 26, 1946 |
| 2,416,595 | Reynolds | Feb. 25, 1947 |
| 2,418,845 | Long | Apr. 15, 1947 |
| 2,427,528 | Hickock | Sept. 16, 1947 |
| 2,432,084 | Blair | Dec. 9, 1947 |
| 2,439,294 | Hammond | Apr. 6, 1948 |
| 2,482,184 | Hoffman et al. | Sept. 20, 1949 |
| 2,484,299 | Labrum | Oct. 11, 1949 |
| 2,507,359 | Weisz | May 9, 1950 |
| 2,547,332 | Loveless et al. | Apr. 3, 1951 |
| 2,571,974 | Walker | Oct. 16, 1951 |
| 2,668,246 | Burt | Feb. 2, 1954 |
| 2,682,624 | Atkins | June 29, 1954 |
| 2,694,162 | English | Nov. 9, 1954 |